United States Patent
Kadlabalu et al.

(10) Patent No.: US 11,544,346 B2
(45) Date of Patent: Jan. 3, 2023

(54) SYSTEM AND METHOD FOR GENERATION OF STARTER WEBSITES

(71) Applicant: ORACLE INTERNATIONAL CORPORATION, Redwood Shores, CA (US)

(72) Inventors: Hareesh S. Kadlabalu, Plainview, NY (US); Hui Zeng, Redwood City, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 63 days.

(21) Appl. No.: 16/657,056

(22) Filed: Oct. 18, 2019

(65) Prior Publication Data
US 2020/0125611 A1    Apr. 23, 2020

Related U.S. Application Data

(60) Provisional application No. 62/748,144, filed on Oct. 19, 2018, provisional application No. 62/748,173, filed on Oct. 19, 2018.

(51) Int. Cl.
| | | |
|---|---|---|
| *G06F 16/958* | (2019.01) | |
| *G06F 16/16* | (2019.01) | |
| *G06F 16/48* | (2019.01) | |
| *G06F 16/907* | (2019.01) | |

(Continued)

(52) U.S. Cl.
CPC .......... *G06F 16/958* (2019.01); *G06F 16/164* (2019.01); *G06F 16/48* (2019.01);
(Continued)

(58) Field of Classification Search
CPC ...... G06F 16/958; G06F 16/164; G06F 16/48; G06F 16/907; G06Q 30/0277; G06Q 30/0609; G06Q 30/0635; G06Q 30/0639; G06Q 30/0641
See application file for complete search history.

(56) References Cited

U.S. PATENT DOCUMENTS

| | | | |
|---|---|---|---|
| 8,584,002 B2 | 11/2013 | Cave et al. | |
| 8,788,622 B2 * | 7/2014 | Sinha | G06F 40/14 |
| | | | 709/218 |

(Continued)

OTHER PUBLICATIONS

Oracle America, "LightCMS", retrieved from https://www.lightcms.com/, Jul. 2019, 5 pages.

*Primary Examiner* — Dangelino N Gortayo
(74) *Attorney, Agent, or Firm* — Tucker Ellis LLP

(57) ABSTRACT

In accordance with an embodiment, described herein is a system and method for generation of starter websites. A content management system (CMS), such as for example, an Oracle Content and Experience Cloud (CEC) environment, can be provided. The content management system can include a site generator within the CMS. The site generator can receive a selection of content managed by the CMS, wherein the content includes data associated with the content. The site generator can determine, based on the data associated with the content, a layout of the content on a document. The site generator can generate machine readable code that, when interpreted or executed by a machine, causes the machine to produce a document including the content wherein the content is displayed in the determined layout.

20 Claims, 6 Drawing Sheets

(51) Int. Cl.
  *G06Q 30/02* (2012.01)
  *G06Q 30/06* (2012.01)
  *H04L 9/40* (2022.01)
  *H04L 67/02* (2022.01)
  *H04L 67/10* (2022.01)

(52) U.S. Cl.
  CPC ....... *G06F 16/907* (2019.01); *G06Q 30/0277* (2013.01); *G06Q 30/0609* (2013.01); *G06Q 30/0635* (2013.01); *G06Q 30/0639* (2013.01); *G06Q 30/0641* (2013.01); *H04L 63/10* (2013.01); *H04L 67/02* (2013.01); *H04L 67/10* (2013.01)

(56) References Cited

U.S. PATENT DOCUMENTS

| | | | |
|---|---|---|---|
| 9,276,995 B2* | 3/2016 | Calvin | H04L 67/56 |
| 9,536,008 B2* | 1/2017 | Keebler | G06F 16/27 |
| 9,965,567 B2 | 5/2018 | Christolini et al. | |
| 9,971,468 B2* | 5/2018 | Ryall | G06Q 10/1097 |
| 10,073,923 B2 | 9/2018 | Koren et al. | |
| 10,579,722 B1* | 3/2020 | Woodward | G06F 40/106 |
| 2008/0177726 A1* | 7/2008 | Forbes | G06Q 30/02 707/999.005 |
| 2010/0095197 A1* | 4/2010 | Klevenz | G06F 40/143 715/234 |
| 2011/0208786 A1* | 8/2011 | Ghosh | G06Q 10/10 707/805 |
| 2012/0005187 A1 | 1/2012 | Chavanne | |
| 2012/0150871 A1* | 6/2012 | Hua | G06F 16/9537 707/E17.02 |
| 2014/0149845 A1* | 5/2014 | Ansel | G06F 16/35 715/234 |
| 2014/0337711 A1* | 11/2014 | Poole | G06F 16/958 715/234 |
| 2016/0179976 A1 | 6/2016 | Piesche et al. | |
| 2016/0292138 A1 | 10/2016 | Tymoshenko et al. | |
| 2017/0109441 A1* | 4/2017 | Berk | G06F 16/24575 |

* cited by examiner

US 11,544,346 B2

SYSTEM AND METHOD FOR GENERATION OF STARTER WEBSITES

CLAIM OF PRIORITY

This application claims the benefit of priority to U.S. Provisional Patent Application No. 62/748,173, filed Oct. 19, 2018; and U.S. Provisional Patent Application No. 62/748,144, filed Oct. 19, 2018; each of which above applications are herein incorporated by reference.

This application is related to U.S. Patent Application entitled "SYSTEM AND METHOD FOR MANAGEMENT AND DELIVERY OF SHOPPABLE CONTENT DATA", application Ser. No. 16/657,052, filed concurrently herewith, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF TECHNOLOGY

This application is generally related to a system and method for generation of starter websites for use with environments such as, for example, information sites, blogs, online commerce environments, or other types of environments.

BACKGROUND

A content management system (CMS) generally allows users to collaboratively manage digital content, such as web content, for display on websites, or on mobile device apps, or other platforms.

For example, a content management system such as Oracle Content and Experience Cloud (CEC) enables the creating, storing, administering, and publishing of associated digital content. Such systems reduce the amount of low-level development required to create and publish the various document forms through which the managed content can be viewed by consumers of that content.

SUMMARY

In accordance with an embodiment, described herein is a system and method for generation of starter websites. A content management system (CMS), such as for example, an Oracle Content and Experience Cloud (CEC) environment, can be provided. The content management system can include a site generator within the CMS. The site generator can receive a selection of content managed by the CMS, wherein the content includes data associated with the content. The site generator can determine, based on the data associated with the content, a layout of the content on a document. The site generator can generate machine readable code that, when interpreted or executed by a machine, causes the machine to produce a document including the content wherein the content is displayed in the determined layout.

DETAILED DESCRIPTION

Figure 1:
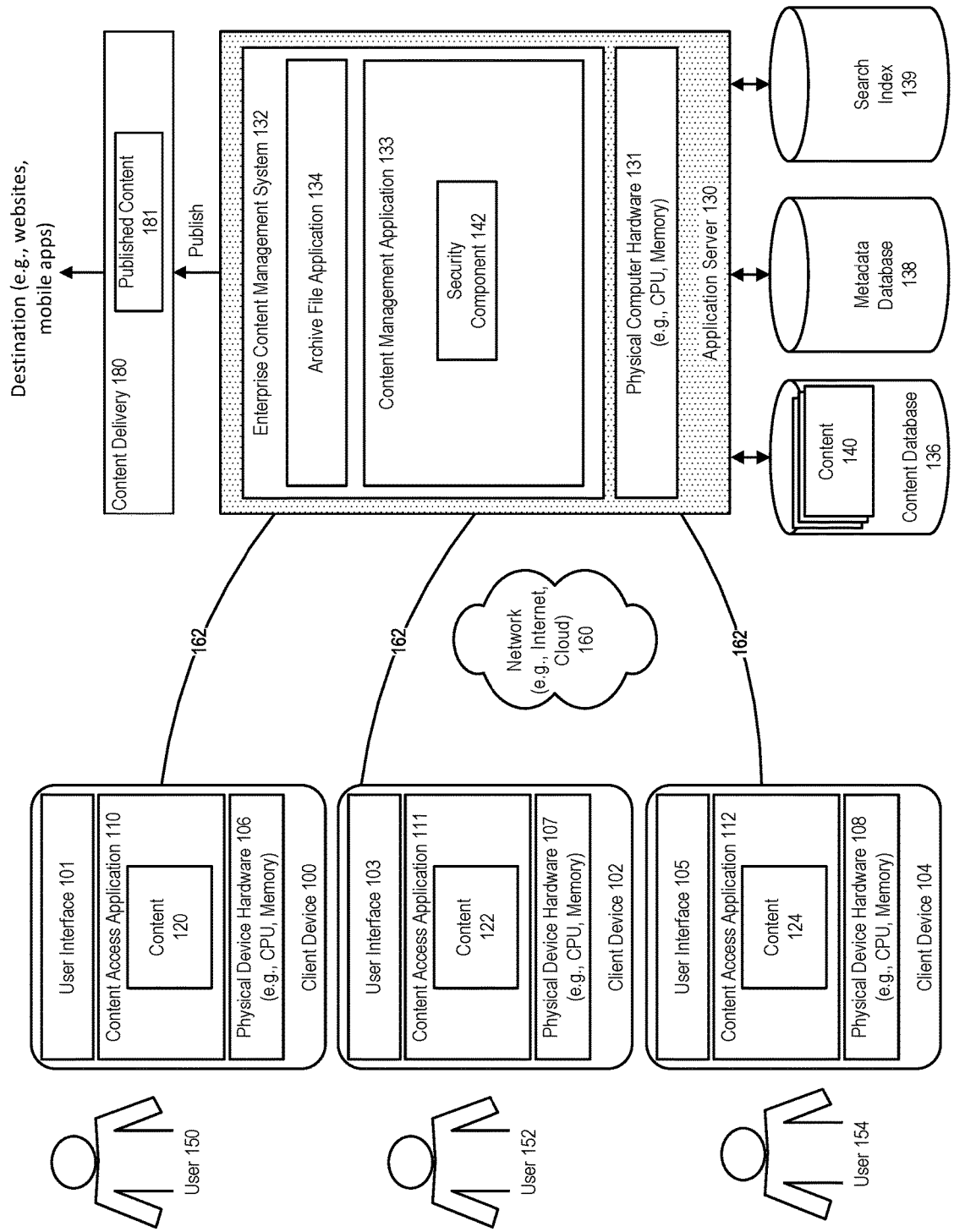
FIG. 1 illustrates a system for content management, in accordance with an embodiment.

The invention is illustrated by way of example and not by way of limitation in the figures of the accompanying drawings, in which like references indicate similar elements. It should be noted that references to "an" or "one" or "some" embodiment(s) in this disclosure are not necessarily referencing the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

One shortcoming in conventional content management systems is the inability to generate websites directly from the dynamic managed content therein. While static site generators are becoming more popular, these, too, are not capable of generating content directly from dynamic content in a CMS. Instead, content must be provided as static content to the static site generator (i.e., taken out of a CMS). The present disclosure provides a site generator that can use the dynamic content stored in a CMS to generate a website, thereby offering an improvement over conventional site-generation applications.

Content management systems are applications that allow users to collaboratively manage digital content, including web content. An example content management system is Oracle Content and Experience Cloud Service (CEC). CEC is a content management service offered from and accessed through cloud services.

Examples of features provided by popular content management systems include creating, storing, administering, and publishing associated digital content. CMSs such as Oracle's Content and Experience Cloud Platform Service allow rapid development and publishing of content across multiple delivery channels.

In accordance with an embodiment, a system and method for generation of start web sites, as described herein, provides:

(1) A starter site tool or site generator that generates web site code—which is the basis for building web sites.
(2) Auto-generated layouts based on content definition.
(3) A template model that enables developers to pre-define how the site generator generates code.
(4) An environment that enables developers to work with local data (exported to file system) or live data—such as published or preview data.

Development Workflow

Generally describes, in accordance with an embodiment, the starter site tool enables development along these workflow steps:

Author:

Content authors create content using content models (Blog, Article etc.,) that have been designed for them.

Publish:

Content authors publish that content to a 'channel'. A channel is a logical end point to which all content that is deemed ready for public consumption is published. Such a channel is capable of delivering content in a headless fashion.

Generate:

The content management system (CMS) provides a command line tool (e.g., CEC Starter Site) that provides two artifacts, 'export content' and 'create site' from content:

>cecss export-server-content {channelName}-o {folder}

The export-server-content accepts a channel name and a folder where the exported data would be stored.

>cecss create-site {sitename}-c {content}

Develop:

The developer can start enhancing the generated site (from the Generate step) as a standalone entity:

```
>cd { sitename }
>npm install
>cecss develop
```

The 'develop' command runs the generated site in development mode.

Deploy:

Once the developer is happy with the site, they can use a command to 'build' an optimized site (production build) using a 'build' command:

>cecss build

The developer can configure the site to fetch live content from the content management system (by switching a configuration flag). Such a site is now ready for deployment in any web server. Once ready, a serve command delivers a production site:

>cecss serve-p {port}

In accordance with an embodiment, the operation of the system during each of the above workflow steps are described in further detail below.

Content Management System

In accordance with an embodiment, content management systems and automated web document development platforms (CMSs) are applications that allow users to collaboratively manage digital content, including web content. An exemplary content management system is Oracle Content and Experience Cloud (CEC). CEC is a content management service offered from and accessed through cloud services.

In accordance with an embodiment, content management systems provided various features. These features can include, but are not limited to, creating, storing, administering, and publishing associated digital content. CMSs, such as Oracle CEC, allow rapid development and publishing of content across multiple delivery channels via automated web document development modules.

In accordance with an embodiment, a delivery channel can be any form in which content is delivered to a consumer of the content. Exemplary delivery channels include websites, blogs, HTML emails, story boards, mobile applications, etc. In order to provide rapid development of the documents used by associated deliver channels, an automated web document development module of a CMS can include features such as out-of-the-box templates, drag-and-drop components, sample page layouts, and site themes, which allow a user to assemble content into a publishable document from predefined building blocks. A conventional CMS uses these components to generate the markup language and code (referred to herein collectively as the "code") of the document.

FIG. 1 illustrates a system for content management, in accordance with an embodiment. More specifically, FIG. 1 illustrates an exemplary content management system which can be used in the development of starter websites, in accordance with an embodiment.

As illustrated in FIG. 1, in accordance with an embodiment, for each of a plurality of client devices 100, 102, and 104 having a user interface 101, 103, 105 and physical device hardware 106, 107, 108 (e.g., CPU, memory), the client device can be provided with a content access application 110, 111, 112 for execution thereon.

In accordance with an embodiment, the client device can communicate 162 with an application server 130 that includes a physical computer hardware 131 (e.g. CPU, memory) and an enterprise content management system 132.

In accordance with an embodiment, the content access application at the client device can communicate with the enterprise content management system via a network 160 (e.g., the Internet, or a cloud environment). The content access application can be configured to enable a user 150, 152, 154 to view, upload, modify, delete, or otherwise access content such as content items 120, 122, 124 at each client device. For example, new content can be added or uploaded to the enterprise content management system by a user interacting with the content access application on an associated client device. The content can be transmitted to the enterprise content management system for storage.

In accordance with an embodiment, the content management system can be or include a platform for consolidating content that can be managed by a number of users or clients. In accordance with an embodiment, the content management system can be configured to communicate with a content database 136 for storing content (or content items) 140, and can deliver the content to users via their client devices. In accordance with an embodiment, the content database can be a relational database management system (RDBMS), file system, or other data source which the enterprise content management system can access. Content can include, for example, documents, files, e-mails, memos, images, videos, slide presentations, conversations, and user profiles.

In accordance with an embodiment, the enterprise content management system can be configured to associate metadata with the content. Metadata can include information about an item of content, such as its title, author, release date, historical data such as who has accessed the item and when, a location where the content is stored, and the like.

In accordance with an embodiment, the metadata can be stored in a metadata database 138. In accordance with an embodiment, the enterprise content management system can be configured to communicate with the metadata database to access metadata stored therein, and to store metadata generated by the system in the metadata database.

In accordance with an embodiment, the content management system can also be configured to communicate with a search index 139. The search index can be configured to provide indexing and searching of content and data stored in the content database and the metadata database. In accordance with an embodiment, the search index can be a relational database management system (RDBMS) or a search tool such as Oracle Secure Enterprise Search (Oracle SES).

In accordance with an embodiment, the enterprise content management system can further include a content management application 133 including a security component 142.

The security component can include or store a security data including user permissions and privileges with respect to particular items of content and/or particular actions. For example, the security data can indicate that certain users are permitted to access and/or modify certain documents. As another example, the security data can indicate that only certain users are permitted to create links between content items, to modify certain content items, or to delete content items.

In accordance with an embodiment, content managed by users can be published before such content can be used by end users (e.g., via web sites and applications). That is, the application server hosting the content management system 132 can publish content therein to a content delivery 180 module, as published content 180, for use at, for example, a website or a mobile application. Such published content can comprise a read-only snapshot of the content managed by the CMS. Published content can exist in multiple local contexts called channels. Once content is published, it is available to web sites and other clients via content APIs (e.g., in a headless fashion).

Starter Site Tool

Figure 2:
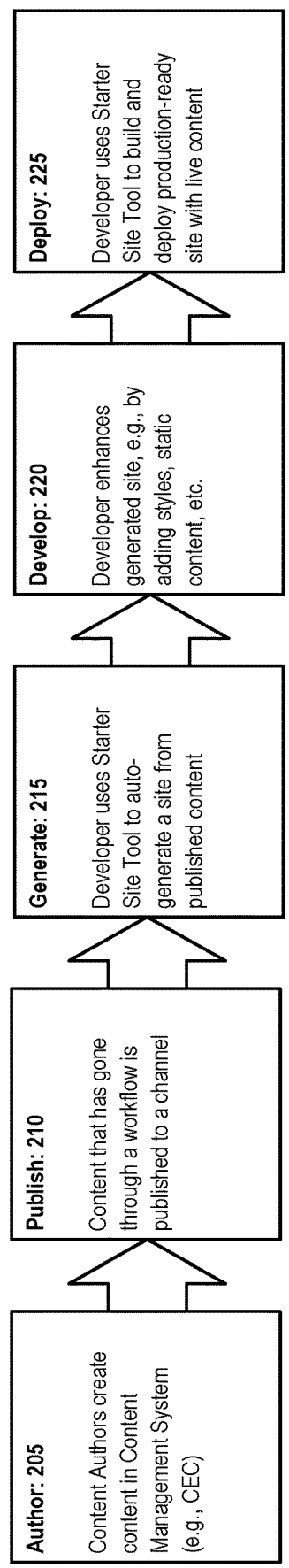
FIG. 2 shows a flow of a starter site tool that enables development and generation of starter websites, in accordance with an embodiment.

FIG. 2 shows a flow of a starter site tool that enables development and generation of starter websites, in accordance with an embodiment.

More specifically, in accordance with an embodiment, FIG. 2 shows a series of workflow steps for the development and generation of starter websites.

In accordance with an embodiment, workflow step 205 describes the role of an author. Content authors create content using content models (Blog, Article etc.,) that have been previously designed.

In accordance with an embodiment, workflow step 210 describes the publish role. Content authors publish that content to a 'channel'. A channel is a logical end point to which all content that is deemed ready for public consumption is published. Such a channel is capable of delivering content in a headless fashion.

In accordance with an embodiment, workflow step 215 describes the generate role within the workflow. In such a step, the content management system (CMS) provides a command line tool (e.g., CEC Starter Site) that provides at least two artifacts, 'export content' and 'create site' from content. Illustrated below is an example command that can be issued for the export content artifact:

\>cecss export-server-content {channelName}-o {folder}

In accordance with an embodiment, the export-server-content can accept a channel name and a folder where the exported data can be stored. Once this command runs, content that is published to {channelName} is exported to a file system in the form a file (e.g., such as a compressed or archived file, such as a .zip file), under {folder}. Such a content export contains within in it all content, their identity and related content—such that no live connection to the content management system is required to work with this content.

In accordance with an embodiment, illustrated below is an example command that can be issued for the create site artifact:

\>cecss create-site {sitename}-c {content}

In accordance with an embodiment, once the content is exported, a create-site command creates a site using that content. In one example, the generated site is a React site, and contains auto-generated components for each type found in the export. The create-site command also creates a node server that can serve from the content export locally—such that the site can be developed fully in a local developer environment.

In accordance with an embodiment, workflow step 220 describes the develop role within the workflow. The developer can start enhancing the generated site (from the Generate step) as a standalone entity. Illustrated below is an example command that can be issued for the develop steps:

```
>cd { sitename }
>npm install
>cecss develop
```

In accordance with an embodiment, the 'develop' command can run the generated site in development mode. It runs a local node server for delivering content, in addition to a local server for delivering site pages. Developers can alter the component code directly in the file system, and the running site refreshes, which allows developers to easily debug their code.

In accordance with an embodiment, workflow step 225 describes the deploy role within the workflow. Once the developer is happy with the site, they can use a command to 'build' an optimized site (production build) using a 'build' command. Illustrated below is an example command that can be issued for the develop steps:

\>cecss build

In accordance with an embodiment, the developer can configure the site to fetch live content from the content management system (by switching a configuration flag). Such a site is then ready for deployment in any web server. Once ready, a serve command delivers a production site. Illustrated below is an example of a serve command:

\>cecss serve-p (port)

Figure 3:
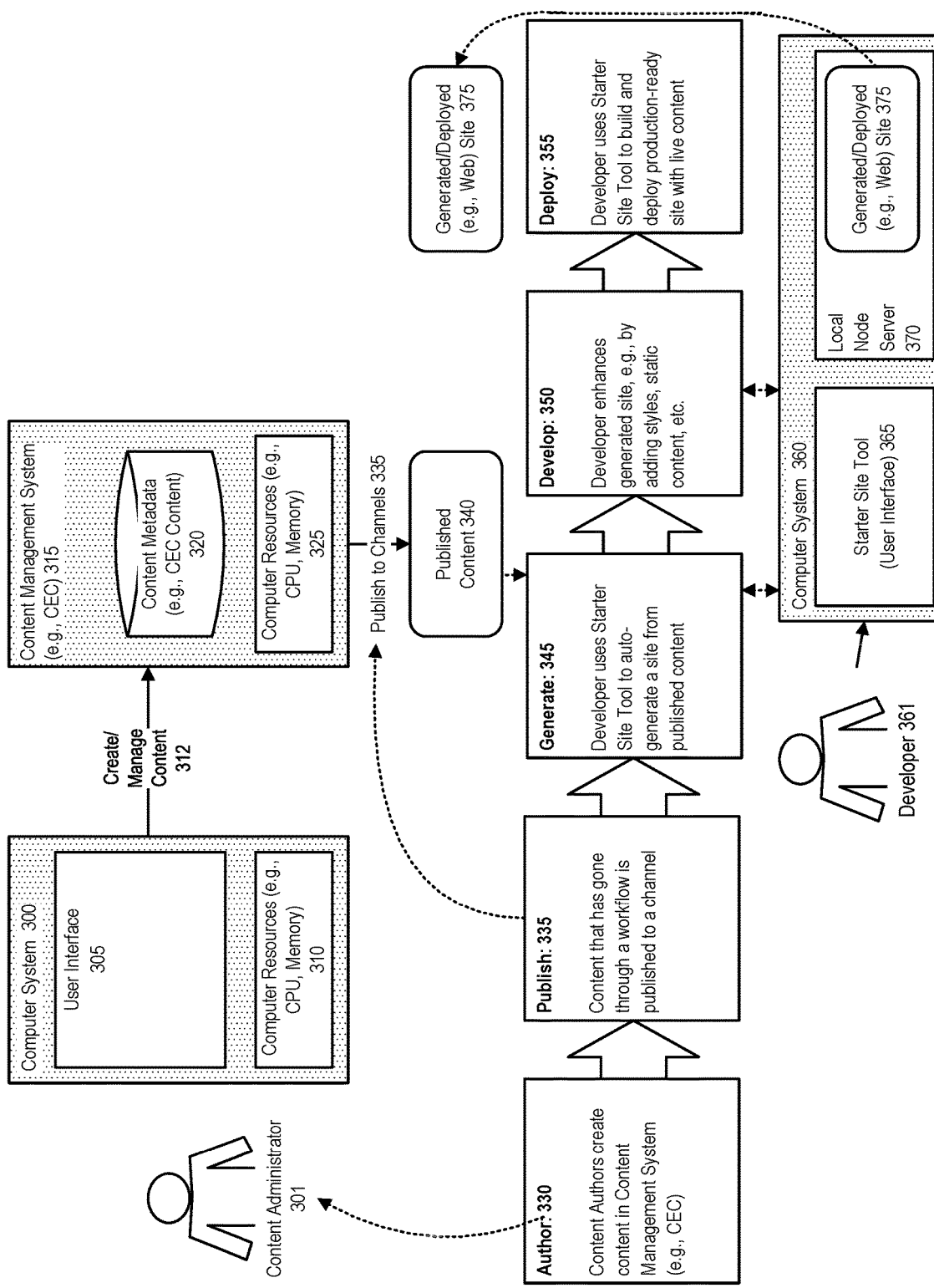
FIG. 3 shows a system for generation of starter websites, in accordance with an embodiment.

FIG. 3 shows a system for generation of starter websites, in accordance with an embodiment.

In accordance with an embodiment, a computer system 300 can comprise a user interface 305 as well as various computer resources 310, such as CPU and memory. A content administrator 301 can utilize the computer system 300 to create and manage content 312 at a content management system 315 (e.g., CEC). The content management system can comprise content metadata 320 (e.g., CED content), as well as computer resources 325, such as CPU and memory.

In accordance with an embodiment, a backend computer system 360, which can be accessed and used by a developer 361, can comprise a starter site tool 365 as well as a local node server 370, which can provide a generated/deployed website 375.

In accordance with an embodiment, a content administrator can author content, via the user interface 305. Content authors create content using content models (Blog, Article etc.,) that have been previously designed and provided. Such authored content exists in the content management system 315.

In accordance with an embodiment, after the content has been authored, it can be published 335 to channels as published content 340. Content authors publish the content to a 'channel'. A channel is a logical end point to which all content that is deemed ready for public consumption is published. Such a channel is capable of delivering content in a headless fashion.

In accordance with an embodiment, at the generate step 345, the starter site tool 365 can be used to automatically generate a site (e.g., mobile site or desktop site) from the published content 340. This can be done via the back end computer system 360.

In accordance with an embodiment, during the develop step 350, the backend computer system can be used to can enhance the generated site by, for example, adding styles to the generated site or static content. In such a step, the backend computer system can enhance the generated site (from the generate step 345) as a standalone entity.

In accordance with an embodiment, this develop step 350 can run the generated site in development mode. This means the site can be run on a local node server for delivering content, in addition to a local server for delivering site pages. Developers can alter the component code directly in the file system, and the running site refreshes, which allows developers to easily debug their code.

In accordance with an embodiment, during the deploy step 355, the starter site tool can be used to build and deploy a production-ready site with live content. Once the client is satisfied site, the deploy step can be used as a command to 'build' an optimized site (production build) using a 'build' command. In accordance with an embodiment, the developer can configure the site to fetch live content from the content management system (by switching a configuration flag). Such a site is then ready for deployment in any web server. The generated site (e.g., website, mobile site, mobile application page . . . etc.) can be provided on a local node server 370.

In accordance with an embodiment, as illustrated in FIG. 3, the starter site tool 365, can evaluate dynamic content stored in the content management system. The starter site too can additionally generate code for producing a document, e.g., a starter web site 375, which displays the content.

In accordance with an embodiment, as an example, a user of the content management system can provide the starter site tool or site generator with a content-type object and, optionally, one or more product-field objects; which can determine that, e.g., a web blog content-type was provided, and that, e.g., a product-field object was provided. The product-field object can be provided when a product (e.g., for sale) should be placed on the starter site.

In accordance with an embodiment, a web blog content-type can be associated with a particular layout. For example the web blog document can be associated with a two-column web page layout. Thus, the site generator can generate code that produces a two-column HTML document.

In accordance with an embodiment, the code can be pre-generated in a web-blog template. Additionally, the web blog template can include areas for particular attributes supplied by the user during the creation of the web blog. For example, the user can supply a title and body text as attributes of the web blog object during creation.

In accordance with an embodiment, the system can receive instructions (e.g., from a user) to add a product-field object to the web blog object when appropriate to do so. Such cases could include, for example, web blog's having products for sale within the web blog. The product-field object can be associated with a particular layout. For example the product-field object can be associated with a rectangular layout. Attributes of the product-field object can have particular layouts within the rectangular layout. For example, an image specified by one of the field attributes can be placed first (at the top of) the rectangular layout. A description text can be placed next, and so on.

In accordance with an embodiment, the systems and methods described herein can be used to create starter web sites in other environments such as, for example, information sites, blogs, online commerce environments, or other types of environments.

In accordance with an embodiment, other content-types and field types (e.g., text fields, date fields, number fields), each having their own particular layout and associated template are contemplated.

In accordance with an embodiment, the site generator can be operated from a command line as a command line tool. The site generator command line tool can have various commands associated with it. The site generator can include a switch that allows a developer to switch a generated site from static content to dynamic content.

In accordance with an embodiment, for example, a developer may want to customize the generated site in the developer's local environment, by adding styles, or additional content; and may wish that the site be generated as a static site until it is ready for deployment. At that time, the developer can employ the switch and allow the site to reflect dynamic content stored in the content management system.

Figure 4:
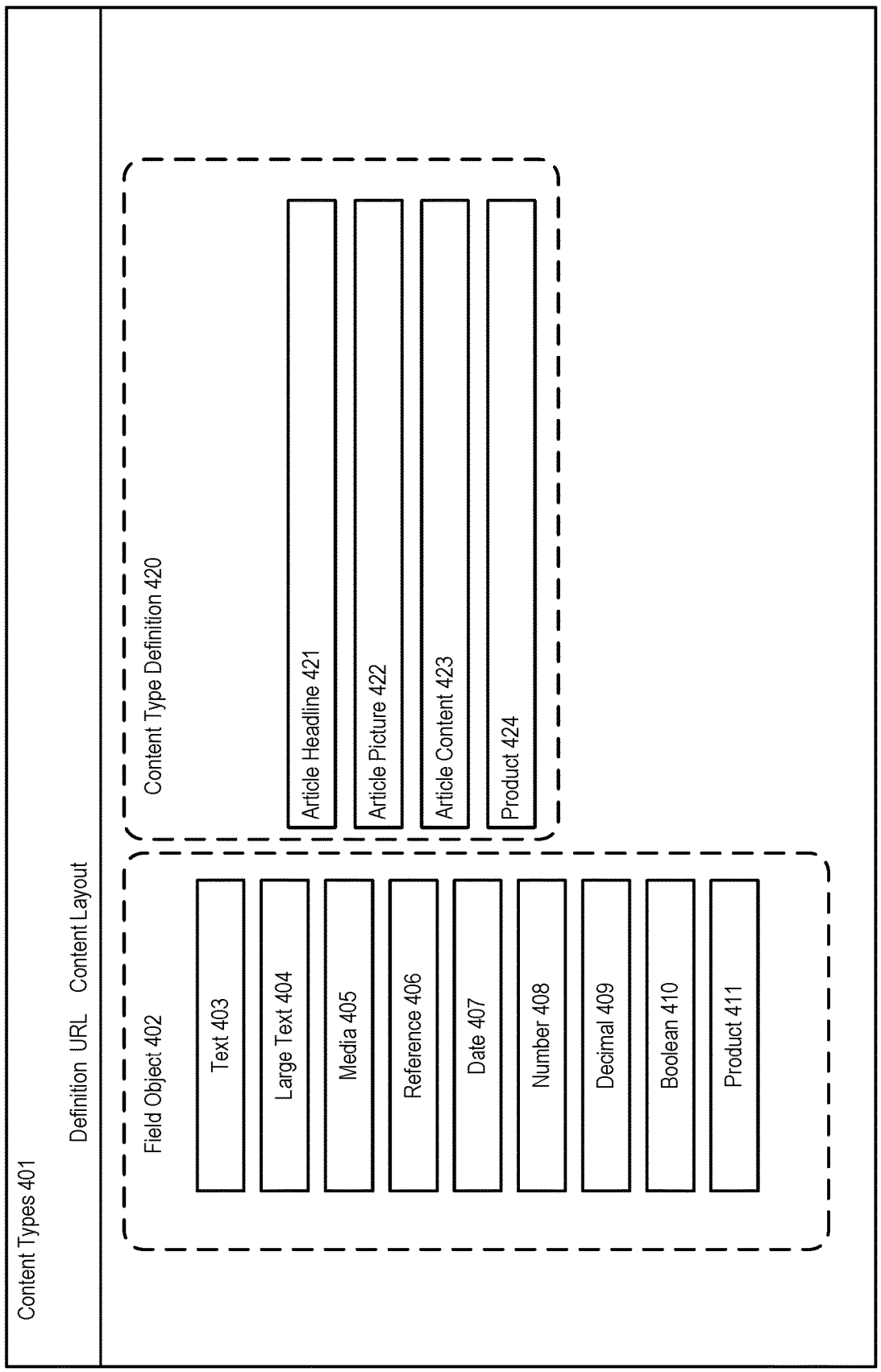
FIG. 4 shows exemplary product field objects, in accordance with an embodiment.

FIG. 4 shows exemplary product field objects, in accordance with an embodiment.

In accordance with an embodiment, a product-field object can be provided when a starter site comprises, for example, a product for sale within the site's contents. For example, a web blog page that lists one or several items for sale.

As illustrated in FIG. 4, by way of example, a product-field object 402 can represent a type of field that can be added to a content type 401, and can be a child object of the content-type object 420. The product-field object can define a number of attributes of a product.

In accordance with an embodiment, a product-field object 402 can represent a type of field that can be added to a document. Such a field object can include, for example, a text field 403, a large text field 404, a media field 405, a reference field 406, a date field 407, a number field 408, a decimal field 409, and a Boolean field 410. Such fields can be considered standard product fields. In addition, the field object 402 can include a special products field 411, which is shared by the content type definition field 420. In accordance with an embodiment, a field object can be a child object of the document-type object 401 or a child of another field object. Document-type objects and field objects include data attributes that define the objects.

In accordance with an embodiment, a content type definition 420 can allow for a user to drag and drop data fields (e.g., from 402) to build a content type definition. As show, for example, such fields include an article headline 421, article picture 422, and article content 423. Such fields can be considered, for example, configured product fields.

In accordance with an embodiment, the product field object 411 and 424 may be defined in the CMS. The product field object can define a number of attributes of a product.

Figure 5:
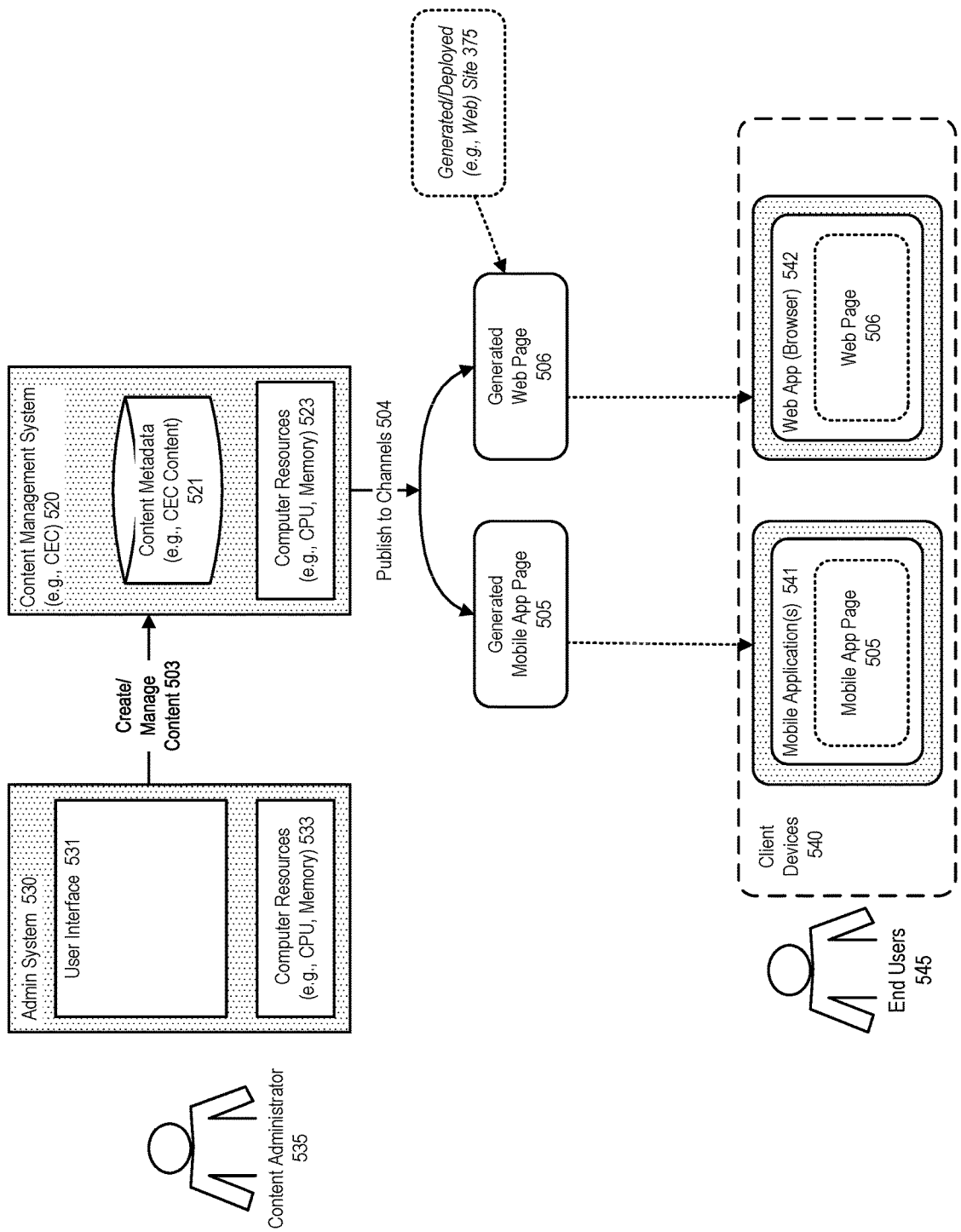
FIG. 5 illustrates an exemplary content management system environment, in accordance with an embodiment.

FIG. 5 illustrates an exemplary content management system environment, in accordance with an embodiment.

As shown in FIG. 5 by way of example, the resultant machine-readable code from the starter website creator as described above can be of a type and format that can be interpreted or executed by a machine to display an online or publishable content (e.g., a web page 506, or mobile application (app) page 505).

In accordance with an embodiment, a content management system (e.g. CEC) 520 can be provided in a system to manage and deliver content data. The content management system can comprise a content metadata database 521 (e.g., CEC Content and Metadata databases), as well as comprise physical computer resources, such as CPU, memory 523.

In accordance with an embodiment, a content administrator 535 can interact with an admin system 530 in such a system to create a starter website as described above. The admin system can comprise or provide a user interface 531. The admin system can also comprise physical computer resources, such as CPU, memory, 533.

In accordance with an embodiment, the content management system, can publish 504 content, such as a generated site 375, to, for example, a generated mobile application page 505 or to a generated web page 506.

In accordance with an embodiment, end users 545 can access such generated pages via a client device 540, for example via a mobile application 541 displaying the generated mobile application page 505, or via a web application, such as a browser 542, accessing and displaying the generated web page 506. Via the client devices, then, the end users can interact with the starter web page.

Figure 6:
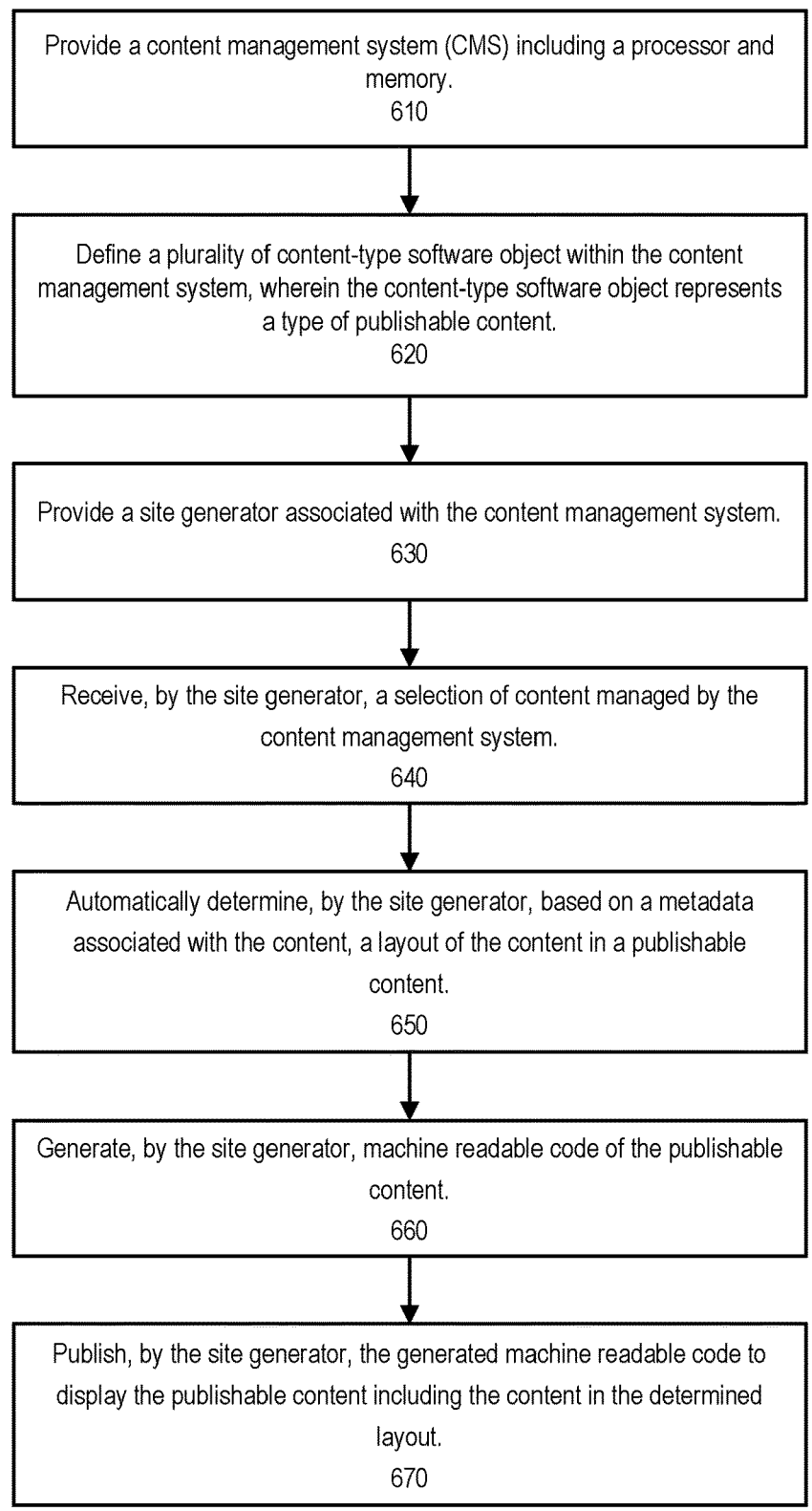
FIG. 6 is a flowchart of a method for automatically generating starter sites, in accordance with an embodiment.

FIG. 6 is a flowchart of a method for automatically generating starter sites, in accordance with an embodiment.

In accordance with an embodiment, at step 610, the method can provide a content management system (CMS) including a processor and memory.

In accordance with an embodiment, at step 620, the method can define a plurality of content-type software objects within the content management system, wherein each content-type software object represents a type of publishable content.

In accordance with an embodiment, at step 630, the method can provide a site generator associated with the content management system.

In accordance with an embodiment, at step 640, the method can receive, by the site generator, a selection of content managed by the content management system.

In accordance with an embodiment, at step 650, the method can automatically determine, by the site generator, based on a metadata associated with the content, a layout of the content in a publishable content;

In accordance with an embodiment, at step 660, the method can generate, by the site generator, machine readable code of the publishable content.

In accordance with an embodiment, at step 670, the method can publish, by the site generator, the generated machine readable code to display the publishable content including the content in the determined layout.

Example Use Cases

In accordance with an embodiment, the described approach dramatically reduces the time and effort for a developer by creating a starter site code.

The starter site thus created uses code that components that correctly bind the component to content elements using the content model—this eliminates/reduces the need for developers to understand intimately the details of content API to get started.

The starter site framework allows developers to plug in their own template for site generation—so that they can further automate the generation of sites that comply with customer specifications.

The starter site framework also makes it possible for a developer to develop and debug the site locally (on her machine) and also test with live content in the content management system.

Embodiments described herein can be conveniently implemented using one or more conventional general purpose or specialized digital computer, computing device, machine, or microprocessor, or other type of computer, including one or more processors, memory and/or computer-readable storage media programmed according to the teachings of the present disclosure. Appropriate software coding can readily be prepared by skilled programmers based on the teachings of the present disclosure, as will be apparent to those skilled in the software art.

In accordance with some embodiments, features described herein can be implemented, in whole or in part, in a cloud environment, as part of, or as a service of, a cloud computing system which enables on-demand network access to a shared pool of configurable computing resources (e.g., networks, servers, storage, applications, and services), and which can include characteristics, for example, as defined by the National Institute of Standards and Technology, such as: on-demand self-service; broad network access; resource pooling; rapid elasticity; and measured service. Example cloud deployment models can include: public cloud, private cloud, and hybrid cloud; while example cloud service models can include Software as a Service (SaaS), Platform as a Service (PaaS), Database as a Service (DBaaS), and Infrastructure as a Service (IaaS). In accordance with an embodiment, unless otherwise specified, a cloud, as used herein, can encompass public cloud, private cloud, and hybrid cloud embodiments, and all cloud deployment models including, but not limited to, cloud SaaS, cloud DBaaS, cloud PaaS, and cloud IaaS.

In accordance with some embodiments, a computer program product can be provided which is a non-transitory computer-readable storage medium (media) having instructions stored thereon/in, which can be used to program a computer to perform any of the processes described herein. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for automatically generating starter sites, comprising:
   a content management system (CMS) including a processor and memory;
   a plurality of content-type software objects defined within the content management system, wherein each content-type software object represents a type of publishable content and the content management system manages dynamic content as content-type software objects; and
   a site generator associated with the content management system, the site generator performing a method comprising:

receiving, from a user, a selection of dynamic content managed by the content management system as respective content-type software objects;

automatically determining, based on a metadata associated with content-type software objects corresponding to the selection of dynamic content, a layout of the selected dynamic content in a publishable content;

generating machine readable code of the publishable content; and publishing the generated machine readable code to display the publishable content including the selected dynamic content managed by the content management system in the determined layout, wherein the generated machine readable code includes code to fetch live content from the content management system corresponding to the selected dynamic content for display as the publishable content.

2. The system of claim 1, wherein the content management system comprises a set of features that allow a user to assemble the selected content into the publishable content.

3. The system of claim 1, wherein the site generator receives instructions to use a first content-type software object in generating the machine readable code.

4. The system of claim 3, wherein the site generator determines that the first content-type software object is associated with a site layout.

5. The system of claim 4,
wherein the site layout is a web blog; and
wherein the site generator generates code that produces a web blog format from the received selection of content.

6. The system of claim 4,
wherein the site layout comprise a multi-columned site; and
wherein the site generator generates code that produces a multi-column document from the received selection of content.

7. The system of claim 1, wherein the site generator is operated from a command line as a command line tool that enables commands to be passed to it.

8. A method for automatically generating starter sites, comprising:
providing a content management system (CMS) including a processor and memory;
defining a plurality of content-type software objects within the content management system, wherein each content-type software object represents a type of publishable content and the content management system manages dynamic content as content-type software objects;
providing a site generator associated with the content management system;
receiving, from a user, by the site generator, a selection of dynamic content managed by the content management system as respective content-type software objects;
automatically determining, by the site generator, based on a metadata associated with content-type software objects corresponding to the dynamic content, a layout of the dynamic content in a publishable content;
generating, by the site generator, machine readable code of the publishable content; and
publishing, by the site generator, the generated machine readable code to display the publishable content including the dynamic content managed by the content management system in the determined layout, wherein the generated machine readable code includes code to fetch live content from the content management system corresponding to the selected dynamic content for display as the publishable content.

9. The method of claim 8, wherein the content management system comprises a set of features that allow a user to assemble the selected content into the publishable content.

10. The method of claim 8 wherein the site generator receives instructions to use a first content-type software object in generating the machine readable code.

11. The method of claim 10, wherein the site generator determines that the first content-type software object is associated with a site layout.

12. The system of method 11,
wherein the site layout is a web blog; and
wherein the site generator generates code that produces a web blog format from the received selection of content.

13. The method of claim 11,
wherein the site layout comprise a multi-columned site; and
wherein the site generator generates code that produces a multi-column document from the received selection of content.

14. The method of claim 8, wherein the site generator is operated from a command line as a command line tool that enables commands to be passed to it.

15. A non-transitory computer readable storage medium having instructions thereon for automatically generating starter sites, which when read and executed by cause a computer to perform steps comprising:
providing a content management system (CMS) including a processor and memory;
defining a plurality of content-type software objects within the content management system, wherein each content-type software object represents a type of publishable content and the content management system manages dynamic content as content-type software objects;
providing a site generator associated with the content management system;
receiving, by the site generator from a user, a selection of dynamic content managed by the content management system as respective content-type software objects;
automatically determining, by the site generator, based on a metadata associated with content-type software objects corresponding to the dynamic content, a layout of the dynamic content in a publishable content;
generating, by the site generator, machine readable code of the publishable content; and
publishing, by the site generator, the generated machine readable code to display the publishable content including the dynamic content managed by the content management system in the determined layout, wherein the generated machine readable code includes code to fetch live content from the content management system corresponding to the selected dynamic content for display as the publishable content.

16. The non-transitory computer readable storage medium of claim 15, wherein the content management system comprises a set of features that allow a user to assemble the selected content into the publishable content.

17. The non-transitory computer readable storage medium of claim 15, wherein the site generator receives instructions to use the first content-type software object for use in generating the machine readable code.

18. The non-transitory computer readable storage medium of claim 17, wherein the site generator determines that the first content-type software object is associated with a site layout.

19. The non-transitory computer readable storage medium of method 18,
 wherein the site layout is a web blog; and
 wherein the site generator generates code that produces a web blog format from the received selection of content.

20. The non-transitory computer readable storage medium of claim 18,
 wherein the site layout comprise a multi-columned site; and
 wherein the site generator generates code that produces a multi-column document from the received selection of content.

\* \* \* \* \*